May 6, 1958 P. P. NEWCOMB 2,833,515
TURBINE BLADE
Filed Aug. 20. 1953
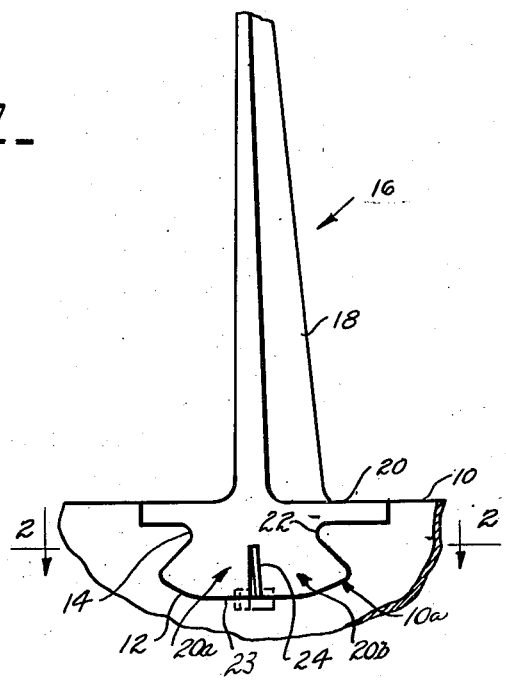
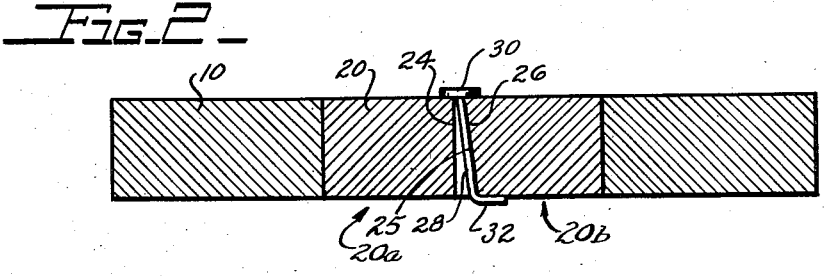
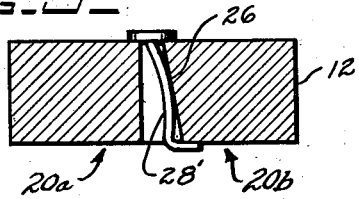
INVENTOR.
PHILIP P. NEWCOMB
BY Maurice H. Klitzman
Wade Loomis AND
ATTORNEYS.

United States Patent Office 2,833,515
Patented May 6, 1958

2,833,515
TURBINE BLADE

Philip P. Newcomb, Manchester, Conn., assignor to the United States of America as represented by the Secretary of the Air Force Application August 20, 1953, Serial No. 375,584

2 Claims. (Cl. 253—77)

This invention relates to a turbine blade and in particular to a turbine blade which is fastened to the disc of a turbine in such a manner as to dampen the vibration forces therein.

In general, during characteristic critical speeds of the turbine, large vibration forces are created on the turbine blade as a result of resonant blade flutter due to vibration about the blade axis. These vibration forces on the blade also tend to rock the blade about the root axis. It is, therefore, an object of this invention to decrease these vibration forces to the extent where they become negligible.

It is another object of this invention to decrease the oscillatory vibrations which subject the blade to flutter about the blade axis by providing a slot in the root of the blade which extends along the root axis thereof and by providing one side of the slot with a taper and inserting a key in the slot which is bent over at its ends to engage the side of the disc and the sides of the root, and by positioning the key in the slot so as to engage the tapered side portion of the slot.

It is a still further object of this invention to provide a slot in the root of the blade to permit flexing of portions of the root and to permit the blade to untwist or rotate a slight extent relative to the circumferential width of the root about its radial axis due to the effect of centrifugal force and gas pressure side loading on the blade air foils.

These and other objects will become more apparent when read in the light of the accompanying drawing and specification wherein the scope of this invention is to be governed by reference to the appended claims and wherein:

Fig. 1 is an elevational view of one blade and a portion of the supporting disc.

Fig. 2 is a cross-sectional view longitudinally of the root of the blade taken about on line 2—2 of Fig. 1 showing the particular taper form of the slot in the blade root.

Fig. 3 is a second cross sectional view similar to Fig. 2 taken about on line 2—2 of Fig. 1 showing a modified form of key at a greater angle than the taper of the blade root slot relative to the blade root axis.

Referring to the figures, the numeral 10 designates a disc or rotor of a turbine. The disc is provided with a retaining blade slot 12 provided with tongues 14. The blade generally designated as 16 has an upper portion 18 and a root portion 20 which is adapted to be retained in the disc slot 12. The root portion 20 is provided with grooves 22 adapted to cooperate with the tongues or shoulders 14 to set up rubbing friction forces therebetween. The blade root 20 is further provided with a radially longitudinally extending slot 24 opening at the base 23 of the root 20, thus dividing the root into two portions 20a and 20b separated by the slot 24. The slot 24 has one tapered side as shown at 26 in Fig. 2 for purposes to be described below.

The blade 16 is held in position on rotor 10 by means of a key 28. The key 28 is positioned in the slot 24 and has bent over end or flange portions 30 and 32 engaging the sides of rotor 10 and blade root 20; and has an intermediate portion 25 engaging the tapered side 26 of slot 24. The key 28 is of less width than the width of the root slot 24 at any point in the slot, to allow flexure of the two portions 20a and 20b of the root 20. With this arrangement, blade vibrations create a frictional rubbing action between the side surfaces of the tapered blade root slot 24 and the retaining key 28. This frictional rubbing action dissipates flutter vibrational energy in the form of heat. This effect is augmented by the frictional rubbing action between the rotor slot tongues or shoulders 14 in the blade root grooves 22 caused by the vibration induced flexures in the blade root. It is noted, as shown in Fig. 3, the modified form of key 28' can be at a greater angle with respect to the blade root axis to further increase this frictional rubbing effect.

During power plant operation, the airfoil section of the blade untwists or rotates about its radial axis due to the effect of centrifugal force and gas pressure side loading on the blade airfoils. This axial rotation can be compensated for by repositioning the entire blade. This repositioning is accomplished by machining the slot 24 in a dovetail root section 20 of the blade 16 at an angle with respect to the blade receiving slot in the disc or rotor 10. As seen in Fig. 2, this was accomplished by providing groove 24 with a tapered side 26. With this arrangement when centrifugal force attempts to pull the blade out of the disc or rotor, considerable loading occurs between the mating surfaces of the dovetail blade root 20 and the disc or rotor slot 12. The blade is designed so that this loading is sufficient to displace elements of the blade root metal on opposite sides of slot 24 and cause the width of the machined slot 24 to be diminished. When this slot is located in the aforesaid angular position described above, the amount of blade root metal as indicated by the blade root portions 20a and 20b on each side of the slot 24 varies materially and consequently, the degree of deflection of the blade root material on each side of the slot also varies materially. The difference in the amount the two blade root portions 20a and 20b on opposite sides of slot 24 are displaced will cause the entire blade to rotate to some degree in response to the radial pull of centrifugal force. This rotation alters the blade pitch with respect to the working fluid and consequently changes the resonant frequency in the blade, thus reducing blade flutter vibration.

It may be easier to understand this concept by first considering the blade root slot to be centrally positioned in the base of the blade root and to have no angularity with respect to the disc slot. With the dove tail root so slotted, centrifugal force exerts a radially outward load on the blade and causes the width of slot 24 to be diminished as the blade root portions 20a and 20b on opposite sides of the slot 24 are displaced. Since the blade root metal of the blade root portions 20a and 20b on each side of the slot is equal, the effect of this displacement will be to evenly diminish the size of the blade root on both sides of slot 24 and, therefore, cause it to be positioned a greater distance from the base 10a of a disc blade retaining slot. In other words, the amount of displacement in the blade root portions 20a and 20b will be the same. The resultant entire blade movement will be in a radial direction only and there will be no rotational or twisting movement. Therefore, by placing this blade root slot 24 at an angle relative to the axis of the axially extending blade root 20 centrifugal loading not only imparts a radial motion to the entire blade but also imparts a twisting motion to the entire blade which counteracts the torque exerted on the blade. The twisting effect is caused by the blade root portions 20a and 20b of the blade root metal on opposite sides of the slot being displaced to a different degree.

The key is made of such size so that it will practically fill the slot but is sufficiently loose enough to allow a desired amount of closing of the slot to dampen out the rocking vibration forces about the axis of the axially extending blade root 20.

In each case the blade is dampened so as to be out of the expected operating frequency range.

Although the specific apparatus embodying this invention has been shown and described, it will be understood that such a showing has been made in order that the invention may be more completely understood, however, such a showing is not to be considered as in any way limiting this invention. Many other types of apparatus may be used to carry out this invention as well as many modifications, additions and omissions from the particular apparatus shown and described, but such modifications, additions and omissions are intended to be included within the spirit and intent of this invention.

What is claimed is:

1. A fluid utilizing apparatus subject to centrifugal forces and fluid pressures comprising, a rotor having at least one axially extending slot formed therein, said rotor having at least one shoulder portion projecting from one side surface of said rotor slot, a blade having a root portion mounted in said rotor slot and shaped to mate with said rotor slot and said shoulder portion, said root portion having a tapered slot therein opening into said rotor slot adjacent the inner periphery of said root portion and extending medially, axially and radially the full width of the blade dividing the blade root into two portions separated by said tapered slot, said tapered slot including a side surface extending parallel to the axis of the rotor slot and a side surface adjacent said shoulder portion inclined to the axis of the rotor slot to permit the blade root to flex about the slotted portion when the blade is subjected to centrifugal forces and so cause the entire blade to rotate to a slight extent about its radial axis to compensate for the effect of centrifugal forces and fluid pressure on the blade and to eliminate resultant blade flutter vibration, said blade root closely fitting in said rotor slot so its flexure against the side surface of the rotor slot transforms the flutter vibrational energy in the blade into heat.

2. A fluid utilizing apparatus as in claim 1 including a key having flanged end portions mounted in said rotor slot and extending the axially extending width of said slot, the flanged end portions of said key bearing against the side surfaces of the blade root and the rotor to retain the blade in position, said key shaped to bear against at least one side surface of the rotor slot whereby the flexure and movement of the blade root in the rotor slot produces frictional resistance between the key and the side surface of the root slot to transform the flutter vibrational energy in the blade into heat.

References Cited in the file of this patent

UNITED STATES PATENTS

| 2,434,935 | Kroon | Jan. 27, 1948 |
| 2,684,831 | Grantham | July 27, 1954 |

FOREIGN PATENTS

| 15,893 | Great Britain | Jan. 28, 1908 |
| 312,864 | Italy | Nov. 28, 1933 |
| 500,250 | Belgium | Jan. 15, 1951 |
| 620,877 | Great Britain | Mar. 31, 1949 |
| 643,914 | Great Britain | Sept. 27, 1950 |
| 672,401 | Great Britain | May 21, 1952 |
| 879,345 | Germany | June 11, 1953 |
| 942,236 | France | Sept. 13, 1948 |